US012275658B2

(12) United States Patent
Ventresque

(10) Patent No.: US 12,275,658 B2
(45) Date of Patent: Apr. 15, 2025

(54) MEMBRANE-BASED LIQUID FILTRATION INSTALLATION AND METHOD FOR PRODUCING DRINKING WATER THEREWITH WITHOUT POST-MINERALISATION

(71) Applicant: Veolia Water Solutions & Technologies Support, Saint-Maurice (FR)

(72) Inventor: Claire Ventresque, Colombes (FR)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 586 days.

(21) Appl. No.: 17/613,743

(22) PCT Filed: May 25, 2020

(86) PCT No.: PCT/EP2020/064463
§ 371 (c)(1),
(2) Date: Nov. 23, 2021

(87) PCT Pub. No.: WO2020/239707
PCT Pub. Date: Dec. 3, 2020

(65) Prior Publication Data
US 2022/0234915 A1    Jul. 28, 2022

(30) Foreign Application Priority Data

May 24, 2019   (FR) ...................................... 1905469

(51) Int. Cl.
*C02F 1/44* (2023.01)
*B01D 63/02* (2006.01)
(Continued)

(52) U.S. Cl.
CPC ............ *C02F 1/442* (2013.01); *B01D 63/031* (2022.08); *B01D 63/10* (2013.01); *C02F 1/441* (2013.01); *C02F 2103/08* (2013.01)

(58) Field of Classification Search
CPC .... B01D 61/025; B01D 61/027; B01D 61/58; B01D 2317/08; C02F 1/441; C02F 1/442
See application file for complete search history.

(56) References Cited

U.S. PATENT DOCUMENTS

2004/0226872 A1   11/2004 Peter Wessels et al.
2007/0272628 A1*  11/2007 Mickols ............... B01D 61/027
                                                 210/336
(Continued)

FOREIGN PATENT DOCUMENTS

CN      102786116 A      11/2012
CN      203513329 U  *    4/2014
(Continued)

OTHER PUBLICATIONS

Zhao machine translation (Year: 2014).*
Dow ECO400 (Year: 2015).*
Dow NF270 (Year: 2015).*

*Primary Examiner* — Bradley R Spies
(74) *Attorney, Agent, or Firm* — COATS & BENNETT, PLLC

(57) ABSTRACT

Installation for the pressurised filtration of liquid with a view to producing drinking water, comprising at least one membrane-based drinking-water production unit (MPU), each MPU comprising: a plurality of filtration blocks each containing a bundle of pressure tubes mounted in parallel, each pressure tube accommodating at least two membrane-based filtration modules with spiral membranes or hollow-fibre membranes mounted in series, means (20) for feeding the liquid that is to be filtered, means for removing the filtered liquid, and means (30) for removing the concentrate, characterised in that the membranes of the filtration modules are of at least two different types selected from the group consisting of reverse-osmosis membranes and low-pressure reverse-osmosis membranes (4-6), on the one hand, and nanofiltration membranes (1-3) on the other hand, and in that at least one MPU comprises means (21-26) making it possible to alter the order in which the blocks of pressure tubes that it groups together are supplied with fluid. The method consists in supplying the filtration blocks of at least (Continued)

one MPU in a first order of supply in which the tubes containing nanofiltration membranes are at the head of the MPU and then in supplying the pressure tubes in a second order of supply in which the pressure tubes containing reverse-osmosis membranes or low-pressure reverse-osmosis membranes are at the head of the MPU.

10 Claims, 2 Drawing Sheets

(51) Int. Cl.
  *B01D 63/10*   (2006.01)
  *C02F 103/08*  (2006.01)

(56) References Cited

U.S. PATENT DOCUMENTS

| | | |
|---|---|---|
| 2016/0031726 A1 | 2/2016 | Zhai |
| 2016/0311696 A1 | 10/2016 | Rock |
| 2018/0179097 A1 | 6/2018 | Navarro et al. |

FOREIGN PATENT DOCUMENTS

| | | |
|---|---|---|
| EP | 1720639 B1 | 12/2012 |
| WO | 2005082497 A1 | 9/2005 |

* cited by examiner

[Fig 1]
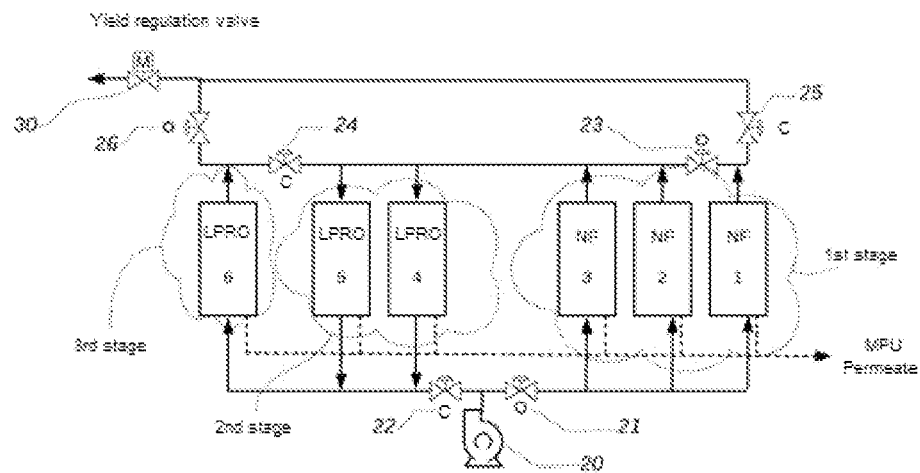
[Fig 2]
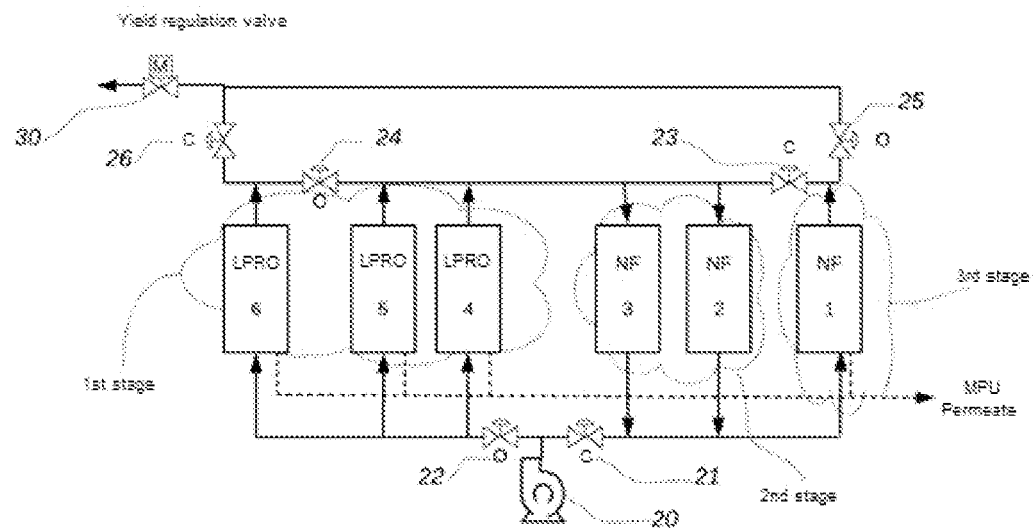

[Fig 3]
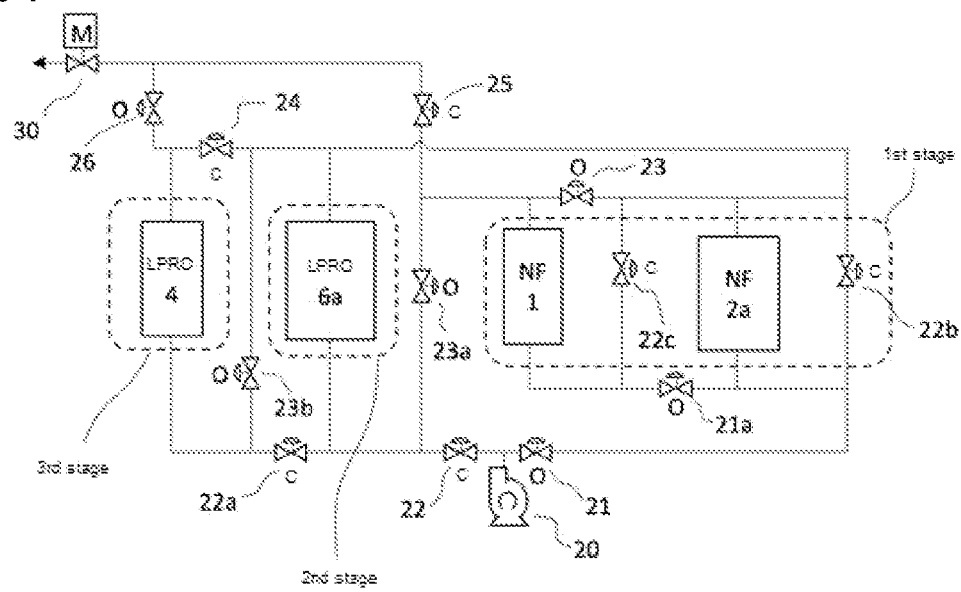
[Fig 4]
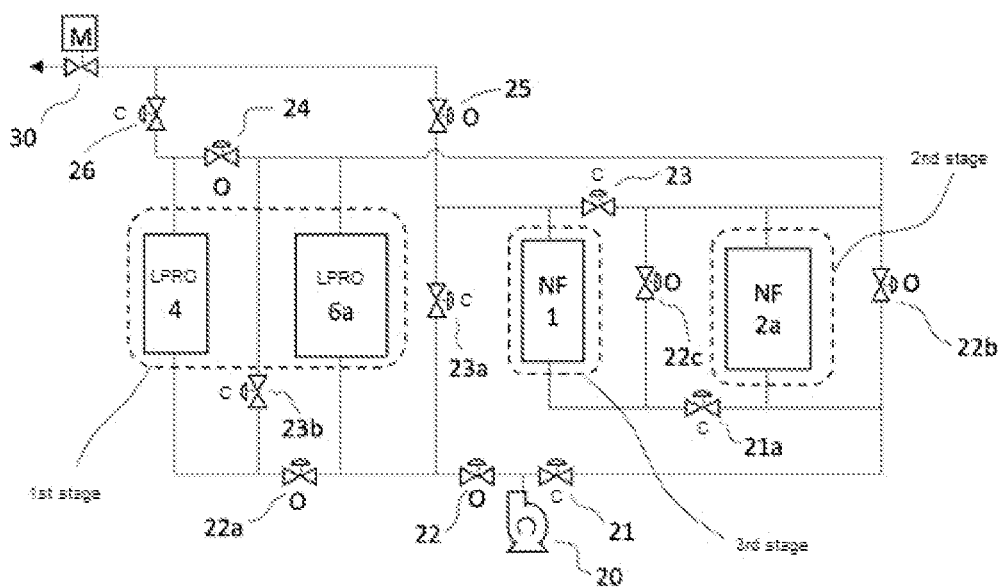

MEMBRANE-BASED LIQUID FILTRATION INSTALLATION AND METHOD FOR PRODUCING DRINKING WATER THEREWITH WITHOUT POST-MINERALISATION

FIELD

The field of the invention is that of the designing and the carrying out of installations implemented for pressurised filtering of liquids using filtration membranes with a view to remove the pollutants therefrom, in particular micropollutants, and to reduce the hardness thereof, in order to produce drinking water. Such liquids can in particular be seawater, drilling water or surface water.

PRIOR ART

Membrane-based filtration methods are widely used in the framework of producing drinking water. The membranes that they implement have a porous structure that allows them to retain the pollutants, in particular micropollutants such as herbicides, pesticides or drug residues and to limit the transfer of one or more solutes in relation to the water.

Thus, microfiltration membranes have pores from 0.1 µm to 1 µm, those for ultra filtration pores from 5 nm to 0.1 µm, those for nanofiltration (NF) pores of a few nanometres. Finally reverse-osmosis membranes have an even denser structure. Among reverse-osmosis membranes, low-pressure reverse-osmosis membranes (LPRO) are distinguished that have a permeability greater than that of the reverse-osmosis membranes used to desalinate seawater (RO). These reverse-osmosis membranes thus make it possible to retain almost all the solutes. Nanofiltration membranes are distinguished from low-pressure reverse-osmosis membranes by the fact that they only partially retain the monovalent ions.

In drinking-water production installations, reverse-osmosis, low-pressure reverse-osmosis and nanofiltration membrane-based filtration modules are in general modules with spiral membranes or modules with hollow-fibre membranes. These modules are disposed in series within pressure tubes that commonly have a size that allows them to receive up to eight modules positioned in series. The water to be filtered is introduced at an end of the pressure tube and passes through the filtration membranes. The filtered liquid (permeate) is collected by a perforated recovery tube disposed along the longitudinal axis at the centre of the modules. Inter-connector devices make it possible to connect together the recovery tubes of the permeate of the different membrane-based filtration modules disposed in series inside the pressure tube. The permeate is recovered at the end of the pressure tubes thanks to permeate collectors, each connected to means for removing permeate. The concentrate, comprised of water concentrated in solutes, is recovered at the opposite end of the pressure tube with respect to the inlet water.

In practice, these pressure tubes are associated in blocks (also called skids) wherein they are mounted in parallel. Collectors are disposed at the outlet of the pressure tubes to collect the permeate and the concentrate. These different collectors are each connected to a common collector.

The installations can be organised into several filtration stages: the concentrate exiting from the first stage supplies and is treated by the membranes of a second stage, the concentrate coming from the second stage supplies and is treated by the membranes of a third stage, etc. The permeates of each stage are gathered together.

Many installations that use this technology comprise a substantial number of filtration blocks. This is in particular the case with drinking-water production installations from seawater, which often comprise more than ten blocks, each one able to group together up to two hundred pressure tubes each receiving up to eight membrane-based filtration modules mounted in series.

In order to minimise the energy consumed in membrane-based systems for water desalination reverse-osmosis membranes can be used in the same pressure tube of which the passages in salts are of the same magnitude but with different permeabilities, so as to distribute the production flows of membranes in the pressure tubes.

For example, patent application DOW (WO200582497A1) relates to a method and an apparatus for treating water with high osmotic pressure, especially seawater, by passing the water through pressure tubes containing at least three elements with spiral membranes of nanofiltration or of reverse osmosis that have different permeabilities, with the most permeable membrane being placed at the tail (concentrate side). This invention consists in better distributing the flows between the spiral membranes of the same pressure tube and in decreasing the operating pressure.

Membrane-based installations for the production of drinking water of which the filtration membranes are only reverse-osmosis membranes or low-pressure reverse-osmosis membranes have the disadvantage of producing water that is entirely demineralised. Indeed, all of the dissolved salts, in particular dissolved calcium, in the liquids to be filtered is retained by reverse-osmosis membranes or low-pressure reverse-osmosis membranes. It follows that this water has to be remineralised in order to render it drinkable.

The installations for the production of drinking water of which the filtration membranes are only nanofiltration membranes have the disadvantage of producing water that, according to the resource, can contain contents in monovalent ions or in micropollutants of low molecular weight that are excessively high or, due to the lower rejection of the divalent ions, may not be demineralised enough.

Indeed, there are no membranes on the market capable of both retaining certain micropollutants of low molecular weight and that allow a portion of the calcium ions to pass. The step of post-mineralisation involves the use of chemicals that can lead to an increase in the turbidity of the water produced. This is the case for example with remineralisation with lime. This step therefore requires including additional equipment in the installations. This step of post-mineralisation therefore significantly increases the overall cost of the operation of rendering water drinkable and the risks of contamination of the water produced.

In order to avoid or minimise such post-mineralisation, installations are known that integrate two branches mounted in parallel one with only reverse-osmosis membranes and the other without a membrane, this is then referred to as bypass, or only with membranes of which the passage in salts is higher, typically nanofiltration membranes, wherein a portion of the liquids is treated in one branch and another portion in the other branch. A treated water constituted by the mixture of water coming from the two branches is thus obtained that does not need to be remineralised. Such double-branches have the disadvantage of being more expensive to implement than conventional branches. In addition, they do not make it possible to obtain drinking water that has a given fixed hardness, in the case where the temperature or the hardness of the waters to be treated varies.

Also note that the hydraulic yields of the membranes of the installations of the prior art are generally limited, which entails relatively substantial losses of water. To reduce this phenomenon, treatments via chemical reagents of the water to be filtered can be set up. However, this leads to increasing the overall costs.

OBJECTIVES OF THE INVENTION

An objective of the present invention is to propose a membrane-based filtration technique for the production of drinking water that makes it possible to overcome any step of post-mineralisation of the water produced by the membranes whether by adding reagent or by adding hard water, while still allowing for an effective reduction of the micropollutants contained in the liquids to be treated.

An objective of the invention is also to propose such a technique that makes it possible to obtain filtered water that has a given target hardness even when the temperature of the liquids to be treated or the concentration thereof in calcium varies.

Another objective of the present invention is to propose a method implementing such an installation making it possible to operate the membranes with hydraulic yields greater than those that can be obtained with the methods of the prior art.

DISCLOSURE OF THE INVENTION

These objectives, as well as others that shall appear in what follows, are achieved thanks to the invention that relates to any installation for the pressurised filtration of liquid with a view to producing drinking water comprising at least one membrane-based drinking-water production unit (MPU), each MPU comprising:
  a plurality of filtration blocks each containing a bundle of pressure tubes mounted in parallel, each pressure tube accommodating at least two membrane-based filtration modules with spiral membranes or hollow-fibre membranes mounted in series,
  means for feeding the liquid that is to be filtered, means for removing the filtered liquid, and means for removing the concentrate, characterised in that said membranes of said filtration modules of said filtration installation are of at least two different types selected from the group consisting in reverse-osmosis membranes and low-pressure reverse-osmosis membranes on the one hand, and nanofiltration membranes on the other hand, and in that said at least one MPU comprises means making it possible to alter the order in which the blocks of pressure tubes that it groups together are supplied.

Thus, according to the invention the installation comprises two types of membranes, nanofiltration membranes on the one hand and reverse-osmosis membranes and/or low-pressure reverse-osmosis membranes on the other hand.

According to a first embodiment, said membranes of at least two different types are provided in different pressure tubes.

According to another embodiment, said membranes of at least two different types are provided in the same pressure tubes.

Advantageously, said nanofiltration membranes used allow for a rate of rejection less than or equal to 70% of the calcium during a standard test with $CaCl_2$. The standard test is carried out on a synthetic water comprised of demineralised water containing 500 mg/l of $CaCl_2$, the module being subjected to a pressure of 75 psi (0.52 MPa) and producing a yield of 15% (yield defined as the flow rate of permeate produced during the test divided by the flow rate of supply water of the membrane-based module). The rejection of the calcium during the standard test is measured at a temperature of 25° C. and with a flow of 31 $L/h/m^2/bar$. This test is referred to as the "standard $CaCl_2$ test". The rate of rejection is defined as the rate of elimination of the solute (rejected in the concentrate), expressed by: concentration in the permeate/concentration in the supply.

Also advantageously, said reverse-osmosis membranes and/or said low-pressure reverse-osmosis membranes allow a rejection rate greater than 90% of the calcium during a standard test with $CaCl_2$.

Advantageously, the installation has a ratio of the numbers of nanofiltration membranes over the total number of membranes comprised between 5% and 95%.

Preferably, said nanofiltration membranes have a standard specific flow, or permeability, greater than 3 $L/h/m^2/bar$ and allow a rejection rate of the monovalent salts less than 82%, said rejection being that observed during a standard test on synthetic water comprised of demineralised water containing 2 g/l of NaCl, the module being subjected to a pressure of 70 psi (4.8 bars) and producing a yield of 15%. The rejection of the sodium during the standard test is measured at a temperature of 25° C. This test is called "standard NaCl test".

Also preferably, said reverse-osmosis membranes or low-pressure reverse-osmosis membranes have a standard specific flow greater than 3 $L/h/m^2/bar$ and allow a rejection rate of the monovalent salts greater than or equal to 82%, said rejection being that observed during a standard NaCl test.

The invention also relates to any method for filtering liquid for the production of drinking water implementing such an installation characterised in that it comprises the steps of supplying the filtration blocks of at least one MPU in a first order of supply wherein the tubes containing nanofiltration membranes are at the head of the MPU, then according to the variation of a parameter, supplying the pressure tubes in a second order of supply wherein the pressure tubes containing reverse-osmosis membranes or low-pressure reverse-osmosis membranes are at the head of the MPU.

Advantageously, each MPU is organised in filtration stages connected in series, each filtration stage comprising, according to the possible configurations thanks to the implementation of said means making it possible to alter the order of supply of said blocks of pressure tubes, either a single filtration block, or 2 to 6 filtration blocks mounted in parallel.

Thus, according to the invention one or more blocks of pressure tubes operating in parallel in the first configuration can operate in series in the second configuration and one or more blocks of pressure tubes operating in series parallel in the first configuration can operate in parallel in the second configuration.

The invention in particular relates to such a method implemented with an installation comprising a plurality N of MPUs, with N>1 an integer, characterised in that it comprises a step of supplying the blocks of x/N MPUs, with x an integer varying from 0 to N, according to said first order, and the blocks of the remaining MPUs according to said second order, and varying x in such a way that the filtered water obtained at the outlet of the installation meets a predetermined quality factor.

Preferably, said parameter is selected from the group consisting of the temperature of the water to be treated.

Also preferably, said quality factor is the hardness of said filtered water obtained at the outlet of the installation.

LIST OF FIGURES

The invention, as well as the different advantages that it has will be easier to understand thanks to the following description of embodiments of the latter given for the purposes of information and in a non-limiting way, in reference to the drawings wherein:

FIG. 1 schematically shows a first embodiment of an installation according to the present invention, the direction of the liquids transiting therein being indicated by arrows corresponds to a first operating configuration referred to as "high temperature configuration".

FIG. 2 schematically shows the same installation operating according to a second configuration referred to as "low water temperature configuration".

FIG. 3 schematically shows a second embodiment of an installation according to the present invention, with the direction of the liquids transiting therein being indicated by arrows corresponds to a first operating configuration referred to as "high temperature configuration".

FIG. 4 schematically shows the same installation as that shown in FIG. 3 operating according to a second configuration referred to as "low water temperature configuration".

DESCRIPTION OF EMBODIMENTS

A first embodiment of an installation according to the present invention is comprised of six identical MPUs (N=6), each one being sized to produce 695 m$^3$/h of drinking water with a yield of 85% from water having an osmotic pressure less than 20 bars.

One of these MPUs is shown in FIGS. 1 and 2. It comprises, in addition to means 20 for feeding the liquid that is to be filtered and means for removing 30 rejected liquid or concentrate, six filtration blocks 1 to 6. Each filtration block contains thirty pressure tubes. Each pressure tube contains six membrane-based filtration modules mounted in series. Thus this MPU contains 1080 membrane-based filtration modules. Therefore the plant, which contains six MPUs, each one with 1080 membranes, includes a total of 6480 membranes.

More precisely, three of these blocks contain NF modules and the other three LPRO modules. In the framework of this embodiment, the NF membranes are spiral membranes marketed under commercial reference DOW FILMTEC NF270-400 and LPRO membranes are spiral membranes marketed under commercial reference DOW FILMTEC ECO-400.

The NF membranes used have a flow rate of 55.6 m$^3$/day under standard CaCl$_2$ test and a rate of rejection in calcium of 40 to 60% under standard CaCl$_2$ test.

The LPRO membranes used have a flow rate of 44 m$^3$/day under standard NaCl test and make it possible to reject 99.7% of the monovalent ions.

In FIGS. 1 and 2 the blocks 1, 2 and 3 with NF modules and the blocks 4, 5 and 6 with LPRO modules are therefore distinguished.

According to the invention, each UMP of the installation is provided with means making it possible to alter the order in which the blocks of pressure tubes that it groups together are supplied. These means are comprised of valves, or of any other isolation device, 21 to 26.

According to the invention, the order in which the modules of each UMP are supplied can vary according to a parameter.

Thus, in reference to FIG. 1, according to a first configuration, the valves or isolation device 21, 23 and 26 are open while the valves or isolation devices 22, 24 and 25 are closed. A first filtration stage comprised of NF blocks 1, 2 and 3 supplied in parallel, a second filtration stage comprised of LPRO blocks 4, 5 supplied in parallel, and a third filtration stage comprised of the LPRO module block 6, are as such delimited.

According to such a configuration, the LPRO takes place at the tail of MPU over two stages, which allows for a good rejection of the micropollutants and of the calcium without degrading the operating pressure.

According to the invention, the order of supply of the blocks 1 to 6 can be altered by closing the valves or isolation devices 21, 23 and 26 and by opening the valves or isolation devices 22, 24 and 25. According to this second configuration, the first filtration stage is comprised of the LPRO blocks of modules 4, 5, 6 mounted in parallel, the second filtration stage is comprised of NF blocks of modules 2 and 3 and the third filtration stage is comprised of the NF block of modules 1.

According to such a second configuration, the nanofiltration takes place at the tail of the MPU over two stages, thus favouring a drop in pressure while still offering a good rejection of micropollutants.

Thus, the block 1 operating in parallel in the first configuration operates in series in the second configuration and the block 6 operating in series in the first configuration operates in parallel in the second configuration.

Simulations were carried out to show that, thanks to the invention, the hardness of the water produced by the installation in a fixed interval can be maintained, for example between 8 and 9° F., while still maintaining good rejection of micropollutants, even in the case of a variation in the temperature or in the quality of the water to be filtered.

In a first battery of simulations, the installation was calculated to filter water with a constant hardness and with a temperature that varies according to the seasons, having the following characteristics:

Calcium content=110 mg/l,
Magnesium content=8 mg/l,
Sodium content=22 mg/l,
Bicarbonate content=230 mg/l, nitrates=20 mg/l,
Chloride content=30 mg/l,
Sulphate content=120 mg/l,
SiO$_2$ content=10 mg/l,
pH=7.1
and of which the temperature varied over one year by 5° C. to 25° C.

The treated water flow rate produced is 100,000 m$^3$/d. The objective for the water produced is set to a minimum of 30 mg/l of calcium (corresponds to a hardness of 8° F.) regardless of the temperature of the water to be filtered. The maximum concentration sought is 35 mg/l of calcium (corresponds to a hardness of 9° F.). In the framework of this first battery of simulations the proportion (x/6) of MPU of the installation operating in the first configuration and the MPU operating in the second configuration are varied according to the temperature of the water to be filtered.

Table 1 hereinafter indicates for each temperature window, and for each proportion (0/6; 1/6; 2/6; 3/6; 4/6; 5/6; 6/6), the calcium concentration (Ca, major constituent of the hardness) of the permeate, the nitrate (NO$_3$) concentration of the permeate as well as the supply pressure (P) of the MPUs.

TABLE 1

| | Temperature 5° C. | | | Temperature 10° C. | | | Temperature 15° C. | | | Temperature 20° C. | | | Temperature 25° C. | | |
|---|---|---|---|---|---|---|---|---|---|---|---|---|---|---|---|
| | Ca (mg/l) | P (bar) | $NO_3$ (mg/l) | Ca (mg/l) | P (bar) | $NO_3$ (mg/l) | Ca (mg/l) | P (bar) | $NO_3$ (mg/l) | Ca (mg/l) | P (bar) | $NO_3$ (mg/l) | Ca (mg/l) | P (bar) | $NO_3$ (mg/l) |
| 0/6 | 30.9 | 7.9 | 15.7 | 35.9 | 6.4 | 16.5 | 40.6 | 5.3 | 17 | 45.1 | 4.3 | 17.6 | 48.9 | 3.7 | 17.8 |
| 1/6 | 28.3 | 8.1 | 14.7 | 33 | 6.6 | 15.5 | 37.4 | 5.6 | 16 | 41.7 | 4.6 | 16.6 | 45.4 | 4 | 16.9 |
| 2/6 | 25.6 | 8.2 | 13.7 | 30 | 6.8 | 14.5 | 34.2 | 5.8 | 15 | 38.3 | 4.8 | 15.6 | 41.9 | 4.2 | 16 |
| 3/6 | 23 | 8.4 | 12.7 | 27.1 | 7.1 | 13.5 | 31 | 6 | 14.1 | 34.9 | 5.1 | 14.6 | 38.4 | 4.4 | 15 |
| 4/6 | 20.4 | 8.5 | 11.6 | 24.2 | 7.3 | 12.5 | 27.8 | 6.3 | 13.1 | 31.4 | 5.3 | 13.7 | 34.8 | 4.7 | 14.1 |
| 5/6 | 17.8 | 8.7 | 10.6 | 21.2 | 7.5 | 11.5 | 24.6 | 6.5 | 12.1 | 28 | 5.6 | 12.7 | 31.3 | 4.9 | 13.2 |
| 6/6 | 15.1 | 8.8 | 9.6 | 18.3 | 7.7 | 10.5 | 21.4 | 6.8 | 11.1 | 24.6 | 5.8 | 11.7 | 27.8 | 5.2 | 12.3 |

In comparison, the same water was treated with an installation of the double branch type of the prior art implementing eight MPUs each containing 135 pressure tubes arranged in three stages. Each pressure tube containing six modules of membrane-based filtration, this installation therefore contains the same number of membrane-based filtration modules as that according to the invention, which is 6480 modules. The same NF and LPRO modules as in the installation according to the invention were implemented.

In order to allow for the obtaining in winter, at a temperature comprised between 5° C. and 10° C., with a minimum hardness of the water produced corresponding to a content of at least 30 mg/l of calcium, the double-branch installation contains a proportion of 25% of NF modules and 75% of LPRO modules.

This double branch was used to filter the same water with the same variations in temperatures. The table 2 hereinafter indicates for each temperature window, the concentrations in calcium (major constituent of the hardness), in nitrates and the supply pressure.

TABLE 2

| Temperature 5° C. | | | Temperature 10° C. | | | Temperature 15° C. | | | Temperature 20° C. | | | Temperature 25° C. | | |
|---|---|---|---|---|---|---|---|---|---|---|---|---|---|---|
| Ca (mg/l) | P (bar) | $NO_3$ (mg/l) | Ca (mg/l) | P (bar) | $NO_3$ (mg/l) | Ca (mg/l) | P (bar) | $NO_3$ (mg/l) | Ca (mg/l) | P (bar) | $NO_3$ (mg/l) | Ca (mg/l) | P (bar) | $NO_3$ (mg/l) |
| 30.4 | 6.5 | 14.4 | 35 | 5.6 | 14.9 | 39.4 | 4.9 | 15.4 | 43.2 | 4.5 | 15.8 | 46.6 | 4.2 | 16.1 |

As can be seen in table 1, it was possible to maintain the calcium concentration of the water produced by the installation between 30 mg/l and 35 mg/l by varying the proportion (MPU operating in the first configuration/total MPU) therefore by altering the order of supply of the blocks of pressure tubes of the MPUs. The invention thus makes it possible to maintain the calcium content of the treated water at about 30 mg/L. Such a result was not able to be obtained with the double branch of the prior art, as shown by the results in table 2 which show an increase in the calcium content well above the desired limit of 35 mg/l in practice having ranged up to 46 mg/l.

These simulations also make it possible to demonstrate that the invention makes it possible to obtain better reduction rate in the nitrates.

It is demonstrated via tests on 5 membranes of different natures that the rejection of nitrates is a good indicator of the rejection of micropollutants. The results of these tests are mentioned in table 3 hereinafter. Thus, the configurations allowing for a good rejection of nitrates, including at the highest temperatures, are to be favoured when a better rejection of micropollutants is sought.

TABLE 3

| Nitrate rejection | Diuron rejection (herbicide) |
|---|---|
| <1% | <1% |
| 58% | 54% |
| 75% | 88% |
| 81% | 91% |
| 95% | 98% |

In a second battery of simulations, the installation was calculated to filter water at a constant temperature and of a variable hardness having the following characteristics:

Magnesium content=8 mg/l,

Sodium content=22 mg/l,

Bicarbonate content=230 mg/l, nitrates=20 mg/l,

Chloride content=30 mg/l,

Sulphate content=120 mg/l, $SiO_2$ content=10 mg/l,

Temperature=15° C.

pH=7.1 and of which the calcium content varied from 90 to 140 mg/l.

The treated water flow rate produced is 100,000 m3/d. The objective for the water produced is set to a minimum of 30 mg/l of calcium regardless of the calcium concentration of the inlet water to be filtered. The maximum concentration sought is 35 mg/l of calcium.

In the framework of this second battery of simulations, the proportion (x/6) of MPU of the installation operating in the first configuration and of MPU operating in the second configuration are varied according to the calcium content of the water to be filtered.

Table 4 hereinafter indicates for each calcium content in the inlet water to be filtered, and for each proportion (0/6; 1/6; 2/6; 3/6; 4/6; 5/6; 6/6), the calcium concentration (major constituent of the hardness) of the permeate, the nitrate concentration of the permeate and the supply pressure.

TABLE 4

| | 90 mg/l of Ca in inlet water | | | 110 mg/l of Ca in inlet water | | | 130 mg/l of Ca in inlet water | | | 140 mg/l of Ca in inlet water | | |
|---|---|---|---|---|---|---|---|---|---|---|---|---|
| | Ca (mg/l) | $NO_3$ (mg/l) | P (bar) | Ca (mg/l) | $NO_3$ (mg/l) | P (bar) | Ca (mg/l) | $NO_3$ (mg/l) | P (bar) | Ca (mg/l) | $NO_3$ (mg/l) | P (bar) |
| 0/6 | 33.2 | 13.91 | 5.24 | 40.6 | 17.01 | 5.31 | 48 | 20.12 | 5.38 | 51.8 | 21.66 | 5.42 |
| 1/6 | 30.6 | 13.1 | 5.5 | 37.4 | 16 | 5.6 | 44.3 | 19 | 5.6 | 47.8 | 20.5 | 5.7 |
| 2/6 | 27.9 | 12.3 | 5.7 | 34.2 | 15 | 5.8 | 40.6 | 17.8 | 5.9 | 43.7 | 19.2 | 5.9 |
| 3/6 | 25.3 | 11.4 | 6 | 31 | 14.1 | 6 | 36.8 | 16.7 | 6.1 | 39.7 | 18 | 6.1 |
| 4/6 | 22.6 | 10.6 | 6.2 | 27.8 | 13.1 | 6.3 | 33.1 | 15.6 | 6.3 | 35.7 | 16.8 | 6.4 |
| 5/6 | 20 | 9.8 | 6.5 | 24.6 | 12.1 | 6.5 | 29.3 | 14.4 | 6.6 | 31.7 | 15.6 | 6.6 |
| 6/6 | 17.3 | 9.0 | 6.7 | 21.4 | 11.1 | 6.8 | 25.6 | 13.3 | 6.8 | 27.7 | 14.4 | 6.9 |

In comparison, the same water was treated with an installation of the double branch type of the prior art implementing eight MPUs each containing 135 pressure tubes arranged in three stages. Each pressure tube containing six membrane-based filtration modules, this installation therefore contains the same number of membrane-based filtration modules as that according to the invention, which is 6480 modules. The same modules NF and LPRO as in the installation according to the invention were implemented.

In order to be able to ensure a minimum hardness of the water produced corresponding to a content of at least 30 mg/l of calcium, for a supply water containing 90 mg/l of calcium, the double-branch installation contains a proportion of 30% of NF modules and 70% of LPRO modules.

This double branch was used to filter the same water with the same variations in concentrations in calcium. Table 5 hereinafter indicates for each calcium content in the inlet water, the concentrations in calcium (major constituent of the hardness) and in nitrates in the permeate and the supply pressure.

TABLE 5

| 90 mg/l of Ca in inlet water | | | 110 mg/l of Ca in inlet water | | | 130 mg/l of Ca in inlet water | | | 140 mg/l of Ca in inlet water | | |
|---|---|---|---|---|---|---|---|---|---|---|---|
| Ca (mg/l) | $NO_3$ (mg/l) | P (bar) | Ca (mg/l) | $NO_3$ (mg/l) | P (bar) | Ca (mg/l) | $NO_3$ (mg/l) | P (bar) | Ca (mg/l) | $NO_3$ (mg/l) | P (bar) |
| 30.1 | 11.79 | 4.93 | 36.84 | 14.44 | 4.96 | 43.57 | 17.1 | 5.04 | 47.02 | 18.44 | 5.26 |

This second battery of simulations makes it possible to demonstrate that the prior art leads to a calcium content of the water produced ranging from 30 to 47 mg/l while the invention makes it possible to maintain this concentration around 30-35 mg/l.

The reduction in nitrates, and therefore of the micropollutants is moreover better thanks to the invention, in most cases.

A second embodiment of an installation according to the present invention comprises six MPUs such as shown in FIGS. 3 and 4 similar to the one shown in reference to FIGS. 1 and 2 except in that it has additional valves or other isolation device (21*a*, 22*a*, 22*b*, 22*c*, 23*a*, 23*b*) and in that it comprises four filtration blocks instead of six. More precisely, one of these blocks (block 1) contains thirty pressure tubes, each pressure tube containing six modules NF, another block (block 2*a*) contains sixty pressure tubes, each pressure tube containing six NF modules, another block (block 4) contains thirty pressure tubes, each pressure tube containing six LPRO modules and another block (block 6*a*) contains sixty pressure tubes, each pressure tube containing six LPRO modules. The capacity of the MPU shown in these FIGS. 3 and 4 is therefore the same as that shown in FIGS. 1 and 2.

In reference to FIG. 3, according to a first configuration, the valves or isolation device 21, 21*a*, 23, 23*a*, 23*b* and 26 are open while the valves or isolation devices 22, 22*a*, 22*b*, 22*c*, 24 and 25 are closed. A first filtration stage comprised of the two NF blocks 1 and 2*a* supplied in parallel, a second filtration stage comprised of the LPRO block 6*a*, and a third filtration stage comprised of the LPRO block 4, are thus delimited.

According to such a configuration, the LPRO takes place at the tail of the MPU over two stages, which allows for good rejection of micropollutants and of calcium without degrading the operating pressure.

According to the invention, the order in which the blocks are supplied can be altered by closing the valves or isolation devices 21, 21 *a*, 23, 23*a*, 23*b* and 26 and by opening the valves or isolation devices 22, 22*a*, 22*b*, 22*c*, 24 and 25.

According to this second configuration, the first filtration stage is comprised of the LPRO blocks of modules 4 and 6*a* mounted in parallel, the second filtration stage is comprised of the NF block 2*a* and the third filtration stage is comprised of the NF block of modules 1.

According to such a second configuration, the nanofiltration takes place at the tail of the MPU over two stages, thus favouring a drop in pressure while still offering a good rejection of micropollutants.

Thus, the block 1 operating in parallel in the first configuration operates in series in the second configuration and the block 6*a* operating in series in the first configuration operate in parallel in the second configuration.

The invention claimed is:

1. A process of treating water and producing drinking water in a system including at least one membrane-based drinking water production unit (MPU) where the MPU includes a plurality of filtration blocks with each block containing a bundle of pressure tubes with each pressure tube including at least two membrane-based filtration modules;

wherein the filtration blocks are divided into at least first and second groups with the pressure tubes of the first group of filtration blocks containing nanofiltration membranes, and wherein the pressure tubes of the second group of filtration blocks contains reverse osmosis membranes;

wherein the MPU includes a piping network connecting the filtration blocks and wherein the piping network includes a first group of valves and a second group of valves; and wherein the process comprises:

opening the first group of valves and closing the second group of valves;

in a first stage of the process with the first group of valves being open and the second group of valves being closed, directing the water to be treated into the piping network and into one or more of said first group of filtration blocks containing the nanofiltration membranes, and in the process, producing a first nanofiltration permeate and concentrate, and directing the first nanofiltration concentrate into and through one or more of said filtration blocks containing the reverse osmosis membranes and in the process producing a first reverse osmosis permeate and concentrate;

closing the first group of valves and opening the second group of valves;

in a second stage of the process where the second group of valves are open and the first group of valves are closed, directing the water to be treated into the piping network and through one or more of said second group of filtration blocks containing the reverse osmosis membranes, and in the process producing a second reverse osmosis permeate and concentrate, and thereafter directing the second reverse osmosis concentrate into and through one or more of said filtration blocks of the first stage containing the nanofiltration membranes and producing a second nanofiltration permeate and concentrate; and wherein during the first stage of the process, the nanofiltration membranes function at the head of the process and the reverse osmosis membranes function at the tail of the process, and wherein during the second stage of the process, the reverse osmosis membranes function at the head of the process and the nanofiltration membranes function at the tail of the process.

2. The process of claim 1 wherein the reverse osmosis membranes include low pressure reverse osmosis membranes.

3. The process of claim 1 implemented by the system comprising a plurality N of MPUs with N>1 an integer, characterized in that it comprises a step of supplying the filtration blocks of X/N MPUs, with X an integer varying from 0 to N, according to said first order, and the filtration blocks of the remaining MPUs according to said second order, and varying X in such a way that the filtered water obtained at the outlet of the system meets a quality factor.

4. The process of claim 1 including opening and closing the first and second set of valves and operating the process in the first or second stage is based on a water parameter.

5. A system for treating water and producing drinking water comprising:
one or more membrane-based drinking water production units (MPU), each MPU including:
i. a plurality of filtration blocks with each filtration block including a bundle of pressure tubes with each pressure tube including at least two membrane-based filtration modules;
ii. wherein the filtration blocks are divided into at least first and second groups with the pressure tubes of the first group of filtration blocks containing nanofiltration membranes, and wherein the pressure tubes of the second group of filtration blocks containing reverse osmosis membranes;
iii. a piping network connecting the filtration blocks and including a water inlet and a concentrate or reject outlet;
iv. a first group of valves incorporated into the piping network;
v. a second group of valves incorporated into the piping network;
vi. wherein the first and second groups of valves are strategically incorporated into the piping network relative to the filtration blocks such that:
a. when the first group of valves are open and the second group of valves are closed, water to be treated enters said inlet of the piping network and is first directed through one or more of the first group of filtration blocks containing the nanofiltration membranes and in the process producing a first nanofiltration permeate and concentrate, and thereafter directing the first nanofiltration concentrate into and through one or more of the second group of filtration blocks containing the reverse osmosis membranes which produces a first reverse osmosis permeate and concentrate; and
b. when the first set of valves are closed and the second set of valves are open, water to be treated is directed into said inlet of the piping network and is first directed through one or more of the second group of filtration blocks containing the reverse osmosis membranes and in the process producing a second reverse osmosis permeate and concentrate, and thereafter directing the second reverse osmosis concentrate into and through one or more of the first group of filtration blocks containing the nanofiltration membranes and producing a second nanofiltration permeate and concentrate.

6. The system according to claim 5 characterized in that the system has a ratio of the number of nanofiltration membranes over the total number of membranes that comprises between 5% and 95%.

7. The system according to claim 5 characterized in that said nanofiltration membranes have a permeability greater than 3 l/h/m²/bar and allow a rejection rate of monovalent salts less than 82%, according to a "standard NaCl test".

8. The process of claim 3 wherein said quality factor is the hardness of the filtered water obtained at the outlet of the installation.

9. The process of claim 4 wherein said parameter is a temperature of the water to be treated.

10. The process of claim 4 wherein said parameter is a calcium concentration of the water to be treated.

* * * * *